United States Patent Office 3,773,930
Patented Nov. 20, 1973

3,773,930
AMINO ACID COMPOSITION
Kasheed Mohammed, East Brunswick, and Jeremy Blake, Kendall Park, N.J., assignors to Johnson & Johnson
No Drawing. Filed Mar. 23, 1971, Ser. No. 127,388
Int. Cl. A61k 15/00, 27/00
U.S. Cl. 424—180                                9 Claims

ABSTRACT OF THE DISCLOSURE

A low residue, dietary composition for supplying nitrogen nutritional requirements is provided comprising at least one amino acid and a quantity of non-amino acid derived caloric material sufficient to obviate the diarrhea problem associated with prior amino acid compositions. The obnoxious taste of the amino acids is masked by including flavoring material in quantities substantially lower than that required to render prior amino acid containing diets palatable, thereby obviating diarrhea problems caused by large quantities of flavoring materials and reducing the cost of the product. The small quantities of flavoring material are made effective in rendering the composition of this invention palatable by the inclusion of pectin, the pectin acting to enhance the masking effect of the flavoring material.

BACKGROUND OF THE INVENTION

This invention concerns essentially residue free dietary compositions for supplying nitrogen nutritional requirements, such compositions being useful in providing the nutritional requirements of pre- and post-operative patients and being particularly useful to users whose normal digestive processes are impaired as, for example, patients in catabolic disease states such as duodenal fistula, the short gut syndrome, pancreatitis, ulcerative colitis and the like. The low residue compositions, designed to be readily absorbed and assimilated in the upper duodenum and upper jetjunum, result in minimal intestinal digestive activity and reduced frequency of defecation with the quantity of fecal matter reduced to essentially endogenous amounts. More specifically, this invention concerns dietary compositions comprising at least one amino acid which, in addition to the above-mentioned properties, does not create the diarrhea problems heretofore associated with compositions containing amino acids and which is rendered palatable by the inclusion of surprisingly small quantities of flavoring materials.

Compositions comprising amino acids have been administered parenterally, rectally and orally and have met their primary objective of providing low residue nitrogen nutritional requirements while simultaneously resulting in decreased digestive activity. A drawback, heretofore associated with dietary compositions of this type, is the production of diarrhea. As used herein, diarrhea is a derangement of the gastrointestinal system which results in excessive doses of water and electrolyte being present in the feces causing them to be soft and, in the extreme, liquid. The production of such abnormal feces is generally accompanied by a violent peristaltic motion of the colon and "cramps." Because users of these compositions are generally in a weakened physical condition, the production of diarrhea greatly reduces the effectiveness of their nutritional regimen.

A further drawback, in the case of oral administration, is that unflavored amino acid compositions exhibit a particularly obnoxious taste and, accordingly, it has heretofore been necessary to add relatively large quantities of flavoring materials such as, for example, the oils of fruits and berries. It is believed that the large quantities of these flavoring oils per se act as an operative factor in producing diarrhea in users and reinforce the diarrhea problems associated with amino acid diets. The necessity of large quantities of flavoring materials is further disadvantageous in that the materials are expensive, thereby significantly increasing the cost of the dietary composition, and that some users tend to develop nausea after subsisting for a length of time on such compositions.

SUMMARY OF THE INVENTION

In accordance with one aspect of the present invention, a readily absorbable, easily assimilated, low residue dietary composition for supplying nitrogen nutritional requirements is provided comprising at least one amino acid and a quantity of non-amino acid caloric material sufficient to obviate the diarrhea tendencies heretofore associated with prior amino acid containing compositions. The non-amino acid caloric material, which preferably comprises carbohydrates and fats as major constituents, is present in sufficient quantities to result in a ratio of total composition caloric value to amino acid derived caloric value of at least about 8.5 and preferably at least about 10.5.

A palatable form of the dietary composition of this invention, suitable for oral administration, is provided with small quantities of pectin and unusually small quantities of flavoring material, preferably the oils of fruits and berries or synthetic flavors simulating the flavor characteristics of fruits and berries. The surprisingly small quantity of flavoring material, relative to that required for prior compositions, is effective in masking the taste of the amino acids apparently because the pectin included therewith acts as a potentiator of the masking effects of the flavoring material and accordingly the problems associated with highly flavored prior compositions, such as the diarrheic effect of the flavoring oils and their high cost, are obviated. The small quantities of pectin used in accordance with this invention are quantities below that at which the mucilaginous taste of the pectin is apparent. Preferably, the pectin is present in the range of about 0.01 to about 0.4 gram of pectin per gram of amino acids and still more preferably in the range of 0.05 to about 0.25 gram of pectin per gram.

The dietary composition of this invention is additionally rendered nutritious with respect to dietary requirements other than nitrogen. For example, a portion of the non-amino acid caloric material described herein may comprise a nutritionally sufficient amount of fat. A mineral portion and/or a vitamin portion may be included to render the composition complete with respect to these dietary requirements.

DETAILED DESCRIPTION OF THE PREFERRED EMBODIMENTS

The amino acid portion

The amino acids used in the dietary compositions of the invention comprise one or more pure individual amino acids, either in the levorotary form or in mixtures of both the levorotary and the dextrorotary forms. A part or all of the amino acid portion may be in the form of the free base or in the form of the alkyl esters, hydrochlorides, the hydrates or combinations theerof of amino acids, these all being available as white crystalline powders.

Preferably, the amino acid portion supplies the entire nutritional nitrogen requirement of the user and, accordingly, includes the nutritional equivalent of at least the eight so-called indispensable amino acids, present in proportions so as to supply at least their respective daily minimum requirements, as reported by Rose et al., Journal of Biological Chemistry 217, 997 (1955) and listed below in Table 1.

TABLE 1

| Amino acid: | Minimum daily requirement (gm./day) |
|---|---|
| 1-valine | 0.80 |
| 1-leucine | 1.10 |
| 1-isoleucine | 0.70 |
| 1-threonine | 0.50 |
| 1-methionine | 1.10 |
| 1-phenylalanine | 1.10 |
| 1-tryptophan | 0.25 |
| 1-lysine | 0.80 |

In addition to these eight indispensable amino acids, others may be provided and, in some instances, are necessary for complete nitrogen nutritional adequacy, depending on age and state of health, and on the existence or absence of such factors as pregnancy, lactation or malnutrition. Such addtional amino acids (hereinafter termed "dispensable") include, for example, tyrosine, alanine, aspartic acid, glutamine, proline, serine, arginine, histidine and cystein in either or both of their optically active forms and the dextrorotary counterparts of the above-listed indispensable amino acids. The proportions of dispensable to indispensable amino acids can range from a ratio of about 0.0 to about 1.5 and, preferably, range from about 0.6 to about 1.5.

The non-amino acid, caloric components

It has now been discovered that in order to overcome the diarrhea problem heretofore associated with the use of prior amino acid compositions, it is necessary to provide a minimum quantity of non-amino acid caloric material. Such material should be present in quantities sufficient to produce a ratio of total composition calories to amino acid derived calories of at least about 8.5 and, preferably, at least about 10.5. The non-amino acid caloric material may comprise carbohydrates and fats although small amounts of caloric value may be derived from the inclusion of flavoring materials. As used herein, the non-amino acid derived caloric material does not include material added to the composition with insignificant caloric value such as pectin, minerals and vitamins.

It is preferred that the bulk of the non-amino acid caloric material comprise carbohydrates. Such carbohydrates may be made up of starch or sugars such as, for example, triose, dextrose, maltose or higher sugars. A preferred sugar combination is a mixture of sugars resulting from the hydrolysis of such starches as cornstarch, tapioca starch or rice starch, whereby the starch is converted, as for example by acid or enzyme treatment, to a mixture of mono-, di-, and tri-saccharides and higher sugars, such a mixture being available under the trademark of FRO-DEX from the American Maize Products Company. Table 2 below illustrates the sugar distribution found in FRO-DEX 36, an acid treated cornstarch having a dextrose equivalent of 36.

TABLE 2

| Sugar: | Percent by weight |
|---|---|
| Mono-saccharide | 14.1 |
| Di-saccharide | 11.7 |
| Tri-saccharide | 10.2 |
| Tetra-saccharide and heavier | 64.0 |

At least a portion of the non-aimno acid caloric material may be provided in the form of fat with the additional advantage that the nutritional requirements of the user with respect to fat may thereby be provided. Generally, because users of these compositions are in a condition whereby their normal activities are restricted, the quantity of fat added to the diet should be lower than the normal fat intake for an active individual.

The fat may be provided in various forms. Natural fat components such as, for example, safflower oil, soy bean oil, linseed oil, olive oil, corn oil, cotton seed oil and coconut oil may be used. Alternatively, fat may be provided in a chemically defined form, such as the glycerol ester of a fatty acid, for example the medium chain length triglycerides (i.e. 6–12 carbon atoms per fatty acid chain) or the alkyl ester of a fatty acid, e.g. ethyl linoleate.

Flavoring materials, such as the oils of fruits and berries, may be added and will contribute to a minor portion of the non-amino acid derived calories, although in accordance with the further teachings of this invention, the quantity of flavoring material necessary may be drastically reduced below that heretofore required for rendering amino acid compositions palatable.

The pectin component

In accordance with the teachings of this invention, it has now been discovered that the inclusion of small quantities of pectin will, for reasons not yet clearly understood, dramatically decrease the quantity of flavoring material necessary to mask the obnoxious taste of the amino acids. For example, a composition including about 0.1 gram of pectin per gram of total amino acids will require about one-fourth the quantity of flavoring materials necessary to result in an organoleptically acceptable product as compared to flavoring quantities required in non-pectin containing compositions. While the optimum quantity of pectin added to a particular dietary composition will depend upon the particular amino acid profile used, the particular flavoring used, and the specific preferences of the user, a minimum quantity effective as a potentiator of taste improvability is about 0.01 gram of pectin per gram of amino acids. Preferably, the pectin quantity should not exceed about 0.4 gram of pectin per gram as it has been found that above this value the dietary composition will have a muciligious taste for a significant number of people. Still more preferably, the pectin quantity should range from about 0.05 to about 0.25 gram of pectin per gram of amino acids.

Pectin is a light-colored, odorless carbohydrate obtained from the dilute acid extract of the inner portion of rinds and skins of citrus fruits and apples and, chemically, comprises partially methoxylated polygalacturonic acid.

Additional components

Vitamin and mineral portions may be added to render the composition nutritionally complete. The vitamin component may include such vitamins as Vitamin A, Vitamin D, Vitamin $B_{12}$, Vitamin C, dl-alpha tocopherol, p-amino benzoic acid or its salts, pantothenic acid or its salts, choline or its salts, folic acid, inositol, niacinamide, riboflavin, pyridoxine and thiamine present in sufficient proportions to supply the user's normal daily requirements.

The mineral component may include sources of such essential minerals as sodium, potassium, calcium, magnesium, manganese, copper, zinc, iron and iodine.

It has been discovered that an apparent synergism exists among the factors of low flavoring levels, the provision of sufficient non-amino acid caloric material, and the inclusion of small quantities of pectin, in that the presence of each of these factors is necessary to simultaneously obviate the diarrhea producing problems heretofore experienced with amino acid compositions and render the amino-acid containing composition of this invention palatable.

For instance, a composition containing a relatively low quantity of flavoring material and sufficient non-amino acid derived caloric material is not diarrhea producing. Such a composition is, however, wholly unacceptable for oral ingestion as the low flavor levels are insufficient to mask the obnoxious taste of the amino acids. By the addition of the third factor, i.e., a small quantity of pectin, the composition is rendered both palatable and non-diarrhea producing. If, however, instead of introducing the pectin, additional flavoring material is provided to render the composition palatable, the composition is diarrhea producing.

Similarly, compositions containing both low quantities of flavoring material and pectin but insufficient quantities of non-amino acid derived caloric material are palatable but are also diarrhea producing. By increasing the quantity of non-amino acid derived caloric material to the levels prescribed herein, these compositions are rendered both palatable and non-diarrheic.

The physiological explanation for the above-described apparent synergism is not yet available. It may be postulated, for example, that the flavoring materials heretofore required in large quantities in order to mask the obnoxious taste of the amino acids are an operative factor in producing diarrhea with prior compositions. These materials, generally in the form of fragrant oils, may act as lubricants in much the same way as mineral oils do and hence at least contribute to the diarrheic properties of prior compositions. Further, the flavoring components may act as irritants in the gastro-intestinal system, and by irritating the walls of the lower digestive tract, they may stimulate the peristaltic reaction characteristic of diarrhea. Such a postulation, however, does not deal with and does not explain the entirely surprising result that a dietary composition including small quantities of pectin may be rendered palatable with the addition of only a fraction of the flavoring material heretofore necessary.

To illustrate the effects of pectin addition upon the required quantity of flavoring material, the following examples are given:

EXAMPLE 1

A dietary composition was prepared containing an amino acid portion, a carbohydrate portion, a fat portion, a mineral portion and a vitamin portion. The composition of each of these portions is tabulated below.

| Portion Component | Parts by weight |
|---|---|
| Amino acid: | |
| l-isoleucine | 3.69 |
| l-leucine | 4.79 |
| l-lysine HCl | 4.56 |
| l-phenylalanine | 2.69 |
| dl-Methionine | 2.73 |
| l-threonine | 2.36 |
| l-tryptophan | 0.64 |
| l-valine | 3.46 |
| l-tyrosine ethyl ester HCl | 2.55 |
| l-arginine HCl | 4.43 |
| l-histidine HCl·$H_2O$ | 1.13 |
| l-alanine | 0.58 |
| l-aspartic acid | 1.96 |
| l-glutamine | 5.03 |
| l-proline | 0.99 |
| l-serine | 1.24 |
| Total amino acids | 42.83 |
| Fat: | |
| Safflower oil | 1.60 |
| Sorbic acid | 0.04 |
| Total | 1.64 |
| Carbohydrate: | |
| Dextrose | 153 |
| Acid hydrolyzed starch | 217 |
| Total carbohydrates | 370 |
| Vitamin: | |
| Vitamin A | 0.0227 |
| Vitamin $D_2$ | 0.0023 |
| Vitamin $B_{12}$ | 0.0006 |
| Ascorbic acid USP | 0.1400 |
| dl-Alpha tocopherol acetate | 0.1100 |
| p-Amino benzoic acid, potassium salt | 0.3904 |
| d-Biotin | 0.0002 |
| Calcium pantothenate | 0.0115 |
| Choline bitartrate | 0.4468 |
| Folic acid | 0.0001 |
| Inositol NF | 0.1282 |
| Niacinamide USP | 0.0187 |
| Riboflavin USP | 0.0018 |
| Pyridoxine HCl | 0.0026 |
| Thiamine mononitrate USP | 0.0014 |
| Total vitamins | 1.2773 |
| Mineral: | |
| Sodium biphosphate monobasic | 5.4533 |
| Potassium chloride anhydrous | 3.1240 |
| Calcium acetate $H_2O$ | 0.0219 |
| Calcium gluconate | 13.3000 |
| Magnesium gluconate | 3.2400 |
| Manganese gluconate $3H_2O$ | 0.0255 |
| Cupric gluconate powder | 0.0139 |
| Zinc sulfate $H_2O$ | 0.0010 |
| Potassium iodine anhydrous | 0.0002 |
| Sorbic acid | 0.2244 |
| Ferrous ammonium sulfate $6H_2O$ | 0.6820 |
| Total minerals | 26.0862 |

Ratio of dispensable to indispensable amino acids, gm./gm. ---- 0.67
[1] Ratio of total composition calories to amino acid derived calories, cal./cal. ---- 10.9

[1] Ratio based on composition flavored as described herein.

The composition was dispersed into tap water in a proportion of 0.263 gram of composition per milliliter of water and flavored to taste with varying proportions of an apricot flavor oil in a mixture having the below-tabulated composition:

FLAVORING COMPOSITION

| Component: | Parts by weight |
|---|---|
| Apricot flavor oil | 8.0 |
| Malic acid | 4.0 |
| Coloring: | |
| FD&C Red #2 | 0.0024 |
| FD&C Yellow #5 | 0.0400 |

A taste panel determined that a concentration of 1.8 grams of apricot flavor oil per 100 grams of dry composition was required to mask the objectionable taste of the amino acids and render the composition organoleptically acceptable.

EXAMPLE 2

A dietary composition was prepared as in Example 1, having amino acid, carbohydrate, fat, vitamin and mineral portions identical in composition to those of Example 1. Five parts by weight of pectin were added, resulting in a final composition having a ratio of 0.117 gram of pectin per gram of amino acids. The pectin-containing composition was then dispersed into tap water in a proportion of 0.263 gram of composition (on a pectin-free basis) per milliliter of water and was flavored to taste with varying proportions of the apricot flavor oil of Example 1 in a mixture having the composition tabulated below:

FLAVORING COMPOSITION

| Component: | Parts by weight |
|---|---|
| Apricot flavor oil | 2.4 |
| Malic acid | 3.2 |
| Coloring: | |
| FD&C Red #2 | 0.0024 |
| FD&C Yellow #5 | 0.0400 |

A taste panel determined that only 0.54 gram of apricot flavor oil per 100 grams of dry composition (on a pectin-free basis) were required to render the pectin-containing dietary composition organolepically acceptable.

Examples 1 and 2 illustrate that by the addition of small quantities of pectin the quantity of flavoring material required to render the diet palatable has been reduced from 1.8 grams of flavoring oil per 100 grams of non-pectin containing dry composition to 0.54 gram per 100 grams for the pectin-containing diet, i.e., a reduction of 30% based on the higher value.

To illustrate the relationship between the flavor improvability aspects of the composition of this invention and the control of diarrhea, the following examples are given:

EXAMPLE 3

A dietary composition essentially identical to the diet composition of Example 1 was prepared, dispersed into tap water in a proportion of 0.33 gram of composition per milliliter of water, and flavored to taste with varying proportions of orange and tangerine oils in a mixture having the below-tabulated composition:

FLAVORING COMPOSITION

| Component: | Parts by weight |
|---|---|
| Orange oil | 9.000 |
| Tangerine oil | 6.000 |
| Citric acid | 9.000 |
| FD&C Yellow #6 | 0.036 |

A taste panel determined that a concentration of 3.4 grams of flavoring oils per 100 grams of dry dietary composition was required to mask the objectionable taste of the amino acids and render the dispersed composition organoleptically acceptable.

To test the diarrheic tendencies, the flavored, dispersed composition was fed to six male and six female, mature, individually housed Sprague Dawley-derived rats. Each animal was permitted 100 milliliters of the water-dispersed composition at 8:30 a.m., 4:30 p.m. and 11:30 p.m. with no additional food or water permitted. At the above-mentioned times, the unconsumed portion of each rat's allocation was discarded and its receptacle was cleansed and refilled. Observations were made with respect to fecal consistency. The above-described procedure was carried out for a period of two weeks.

Diarrhea, indicated by substantial softening of the stools, was noted in 11 of the 12 animals.

EXAMPLE 4

A flavored dispersed dietary composition was prepared in the same manner as that of Example 3 with the following exceptions:

(a) The quantity of flavoring oils was substantially reduced to approximately 28% of the value used in Example 3, i.e., 0.952 gram of flavoring oils per 100 grams of dry dietary composition; and (b) To maintain the ratio of total calories to amino acid calories, the carbohydrate portion of the dietary composition given in Example 3 was modified and is as tabulated below:

| Component: | Parts by weight |
|---|---|
| Dextrose | 163 |
| Acid hydrolyzed starch | 217 |
| Total | 380 |

The feeding procedure was carried out as in Example 3 with a new set of six male and six female Sprague Dawley-derived rats. Additionally, the diet was organoleptically appraised by a taste panel.

No softening of the stools of any of the rats fed with this low flavor level diet was observed. The taste panel however, totally rejected the diet as unpalatable.

EXAMPLE 5

A flavored dispersed diet composition was prepared in the same manner as that of Example 4 with the exception that, to the dietary composition of that example, five parts by weight of pectin were added, resulting in a ratio of 0.117 gram of pectin per gram of amino acids.

The flavored dispersed diet composition was fed to ten male and ten female, mature, individually housed Sprague Dawley-derived rats. As in the foregoing examples, each animal was permitted 100 milliliters of water-dispersed dietary composition at 8:30 a.m., 4:30 p.m. and 11:30 p.m. with no additional food or water permitted. Again, at the above-mentioned times, the unconsumed portion of each rat's allocation was discarded and its receptacle was cleaned and refilled. Observations were made with respect to fecal consistency. The above-described feeding procedure was carried out continuously for a period of eight weeks.

During the entire eight-week duration of this procedure, none of the rats exhibited stool softening.

In addition to the rat feeding procedure described above, the dispersed dietary composition of this example was submitted to a taste panel for organoleptical appraisal. The taste panel evaluated the composition as highly acceptable.

Examples 3, 4, and 5 illustrate the relationship between pectin and both the organoleptical and the diarrhea-controlling aspects of these diets. The composition of Example 3, containing high quantities of flavoring material and no pectin, was found to be organoleptically acceptable but diarrhea producing. The composition of Example 4, containing low quantities of flavoring material and no pectin, was found to be non-diarrhea producing but organoleptically unacceptable. Example 5, containing low quantities of flavoring material and pectin, was found to be both organoleptically acceptable and non-diarrhea producing.

It should be noted that the foregoing examples all concern diet compositions wherein the ratio of total composition calories to amino acid derived calories was held constant at the relatively high value of about 10.8 calories per calorie. To illustrate the importance of this parameter, the following examples are given:

EXAMPLE 6

A dietary composition was prepared containing a carbohydrate portion, a fat portion, a mineral portion and a vitamin portion, all essentially identical to corresponding portions given in Example 1. The composition also included an amino acid portion as tabulated below:

| Portion | Component | Parts by weight |
|---|---|---|
| Amino acid: | | |
| | l-lysine | 3.58 |
| | l-leucine | 3.83 |
| | l-isoleucine | 2.42 |
| | l-valine | 2.67 |
| | l-phenylalanine | 2.75 |
| | l-arginine HCl | 5.70 |
| | l-histidine HCl·H$_2$O | 1.58 |
| | l-alanine | 2.58 |
| | l-aspartic acid | 5.50 |
| | l-threonine | 2.42 |
| | l-proline | 3.42 |
| | Glycine | 4.20 |
| | l-serine | 1.77 |
| | l-tyrosine ethyl ester HCl | 4.10 |
| | l-glutmaine | 9.07 |
| | l-methionine | 1.75 |
| | l-tryptophan | 0.75 |
| | Total amino acids | 58.09 |

The composition then had the following pertinent characteristics:

Ratio of dispensable to indispensable amino acids, gm./gm. _____ 1.5
[1] Ratio of total composition calories to amino acid derived calories, cal./cal. _____ 8.0

[1] Ratio based on composition flavored as described herein.

This composition was dispersed into tap water in a proportion of 0.33 gram of composition per milliliter of water and flavored to taste with varying proportions of orange and tangerine oils in a mixture having the below-tabulated composition:

FLAVORING COMPOSITION

| Component: | Parts by weight |
|---|---|
| Orange oil | 9.00 |
| Tangerine oil | 6.00 |
| Citric acid | 9.00 |
| FD&C Yellow #6 | 0.036 |

A taste panel determined that a concentration of 3.28 grams of flavoring oils per 100 grams of dry composition was required to mask the objectionable taste of the amino acids and render the dispersed composition organoleptically acceptable.

A group of six male and six female rats identical to the rats of the foregoing examples were fed the flavored, dispersed dietary composition for a period of two weeks, under the conditions and procedures of the foregoing examples.

Diarrhea was noted in nine of the twelve animals.

EXAMPLE 7

A flavored, dispersed dietary composition was prepared in the same manner as that of Example 6 with the following exceptions:

(a) Five parts by weight of pectin were added to the dietary composition, resulting in a ratio of 0.086 gram of pectin per gram of amino acids.

(b) The quantity of flavoring oils was reduced to 0.939 gram of flavoring oil per 100 grams of dispersed dietary composition, a quantity determined by a taste panel as being sufficient to mask the taste of the amino acids in the pectin-containing composition; and (c) To maintain the ratio of non-amino acid derived calories to total calories at the same level as in Example 6, the carbohydrate portion of that example was modified as tabulated below:

| Component: | Parts by weight |
|---|---|
| Dextrose | 163 |
| Acid hydrolyzed starch | 217 |
| Total | 380 |

This flavored dispersed composition was fed to another group of six male and six female Sprague Dawley-derived rats following the procedure outlined in the foregoing examples for a period of two weeks.

Notwithstanding the low flavor levels and the inclusion of pectin, diarrhea was noted in seven of the twelve animals.

EXAMPLE 8

A flavored dietary composition similar to that of Example 7 was prepared, with the exception that the amino acid portion was reduced and modified and the carbohydrate portion combined therewith being such as to result in a composition with a relatively higher ratio of total composition calories to amino acid derived calories than that of the two previous examples. The composition of the amino acid and carbohydrate portions is tabulated below:

| Portion | Component | Parts by weight |
|---|---|---|
| Amino acid: | | |
| | l-isoleucine | 1.60 |
| | l-leucine | 2.53 |
| | l-lysine monohydrochloride | 2.37 |
| | l-methionine | 1.64 |
| | l-phenylalanine | 1.82 |
| | l-threonine | 1.60 |
| | l-tryptophan | 0.50 |
| | l-valine | 1.76 |
| | l-alanine | 1.70 |
| | l-arginine monohydrochloride | 3.96 |
| | l-aspartic acid | 3.63 |
| | l-glutamine | 5.99 |
| | Glycine | 2.78 |
| | l-histidine monohydrochloride monohydrate | 1.04 |
| | l-proline | 2.27 |
| | l-serine | 1.17 |
| | l-tyrosine ethyl ester hydrochloride | 2.71 |
| | Total amino acids | 39.07 |
| Carbohydrate: | | |
| | Dextrose | 163 |
| | Acid hydrolyzed starch | 217 |
| | Total carbohydrates | 380 |

The composition then had the following pertinent characteristics:

Ratio of dispensable to indispensable amino acids, gm./gm. _____ 1.5
[1] Ratio of total composition calories to amino acid derived calories, cal./cal. _____ 11.5

[1] Ratio based on composition flavored as described herein.

To this composition, 5.0 parts by weight of pectin were added, resulting in a ratio of 0.128 gram of pectin per gram of amino acids. The composition was then dispersed into tap water in a proportion of 0.33 gram of composition and flavored with 0.939 gram of the same flavoring oils used in Examples 6 and 7 per 100 grams of dry dietary composition.

This flavored, dispersed composition was fed to a group of six male and six female Sprague Dawley-derived rats, following the procedure outlined in the foregoing examples, for a period of two weeks.

Diarrhea was noted in only one of the twelve animals.

Examples 6, 7 and 8 illustrate the coaction between low flavoring content and the ratio of non-amino acid derived calories to total composition calories in controlling the diarrhea problem. The composition of Example 6, containing no pectin and having a relatively low ratio of total composition calories to amino acid derived calories, characteristically required relatively large quantities of flavoring to be palatable and produced diarrhea. The composition of Example 7, in accordance with one aspect of this invention, included pectin and hence required far less flavoring but, surprisingly, still produced diarrhea. The composition of Example 8, which like that of Example 7 contains pectin and relatively low quantities of flavoring, and was also adjusted to increase the ratio of total composition calories to amino acid derived calories, controlled the diarrhea problem in accordance with an aspect of this invention.

It will be understood by those skilled in the art that variations and modifications of the specific examples and descriptions given above may be employed without departing from the scope of the invention as defined in the appended claims.

What is claimed is:

1. A low residual dietary composition for supplying nitrogen nutritional requirements comprising (1) amino acids; (2) a non-amino acid caloric material selected from the group consisting of starch, sugar and mixtures thereof, said amino acid and said non-amino acid caloric material being present in quantities whereby the ratio of total composition caloric value to amino acid derived caloric value is at least 8.5; (3) about 0.025 to about 0.25 gram of pectin per gram of amino acids and (4) a quantity of flavoring material consisting of the oils of fruits and berries insufficient to render said composition palatable in the absence of said pectin.

2. The composition of claim 1 wherein the non-amino acid caloric material is present in quantities whereby the ratio of the total composition caloric value to the amino acid derived caloric value is at least about 10.5.

3. The composition of claim 1 wherein the starch is hydrolyzed starch.

4. The composition of claim 1 further comprising a minor amount of fats.

5. The composition of claim 1 further comprising a minor amount of vitamins.

6. The composition of claim 1 further comprising a minor amount of minerals.

7. The composition of claim 1 wherein the pectin is present in the range of 0.05 to about 0.15 gram of pectin per gram of amino acids.

8. The composition of claim 1 wherein the amino acids consist of dispensable amino acids and indispensable amino acids present in the ratio of 0 to about 1.5 grams of dispensable amino acids per gram of indispensable amino acids.

9. The composition of claim 8 wherein the amino acids comprise valine, leucine, isoleucine, threonine, methionine, phenylalanine, tryptophan, lysine, tyrosine, alanine, aspartic acid, glutamine, proline, serine, arginine, histidine and cystein.

References Cited
UNITED STATES PATENTS

| | | | |
|---|---|---|---|
| 2,887,437 | 5/1959 | Klioze et al. | 424—319 X |
| 3,080,234 | 3/1963 | Jarowski | 424—319 |
| 3,152,955 | 10/1964 | Gow et al. | 424—319 X |
| 2,816,854 | 12/1957 | Gross | 424—319 X |
| 2,457,820 | 1/1949 | Howe et al. | 424—319 |
| 2,738,299 | 3/1956 | Frost et al. | 424—319 X |
| 3,146,166 | 8/1964 | Heathcote | 424—319 X |
| 3,485,920 | 12/1969 | Bender | 424—361 X |

OTHER REFERENCES

Ansel: "O-T-C Diarrhea Remedies," Handbook of Non-Prescription Drugs, pub. Am. Pharm. Assoc., pp. 37–40 (1967).

Gregory: Uses & Applications of Chemicals & Related Materials, p. 447 (1939).

Kirk-Othmer: Encyclopedia of Chemical Technology, 2nd Ed., pp. 206 and 208 (1967).

ALBERT T. MEYERS, Primary Examiner

L. SCHENKMAN, Assistant Examiner

U.S. Cl. X.R.

424—195, 201, 236, 237, 251, 252, 255, 263, 266, 274, 280, 284, 309, 319, 343, 344, 361